March 25, 1924.　　　　F. S. DUESENBERG　　　　1,488,102
BRAKE SYSTEM
Filed Nov. 2, 1921　　　6 Sheets-Sheet 3
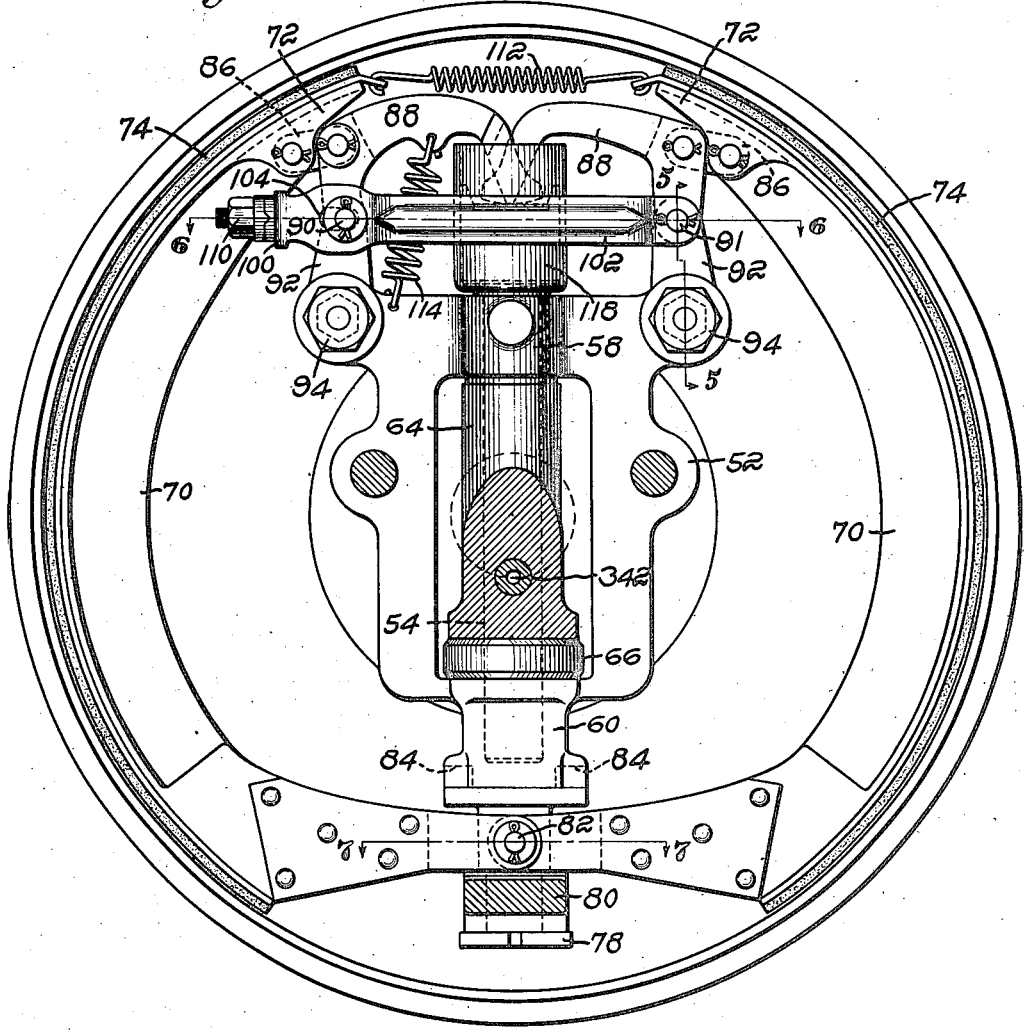
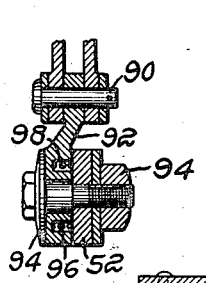
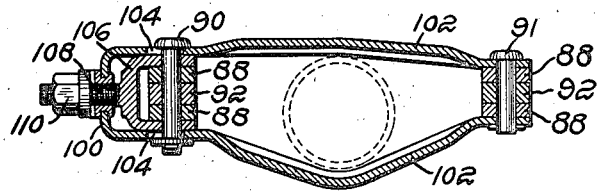
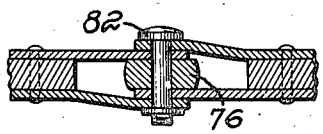
Inventor:
Frederick S. Duesenberg,
by Emery, Booth, Janney & Varney
Attys.

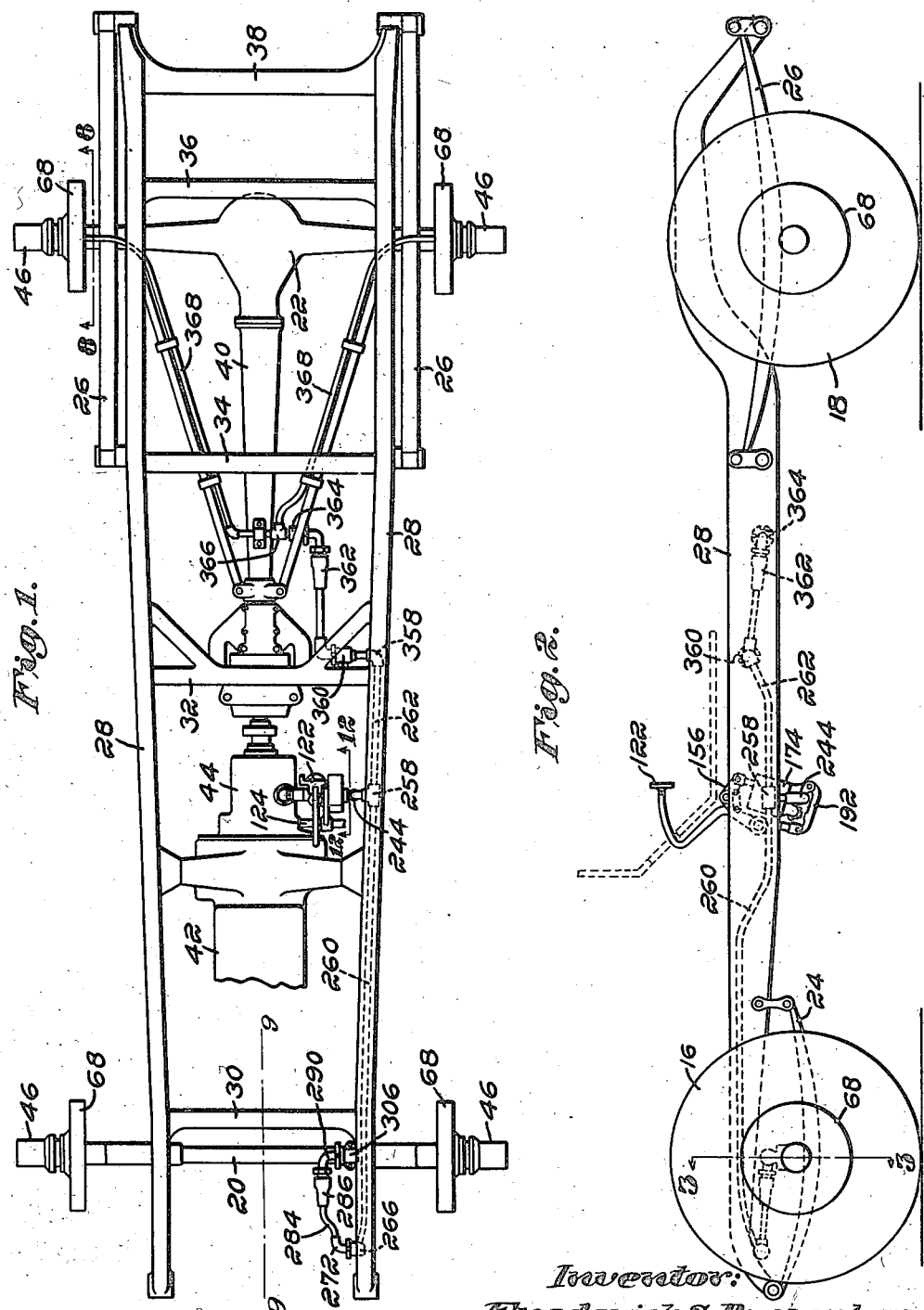

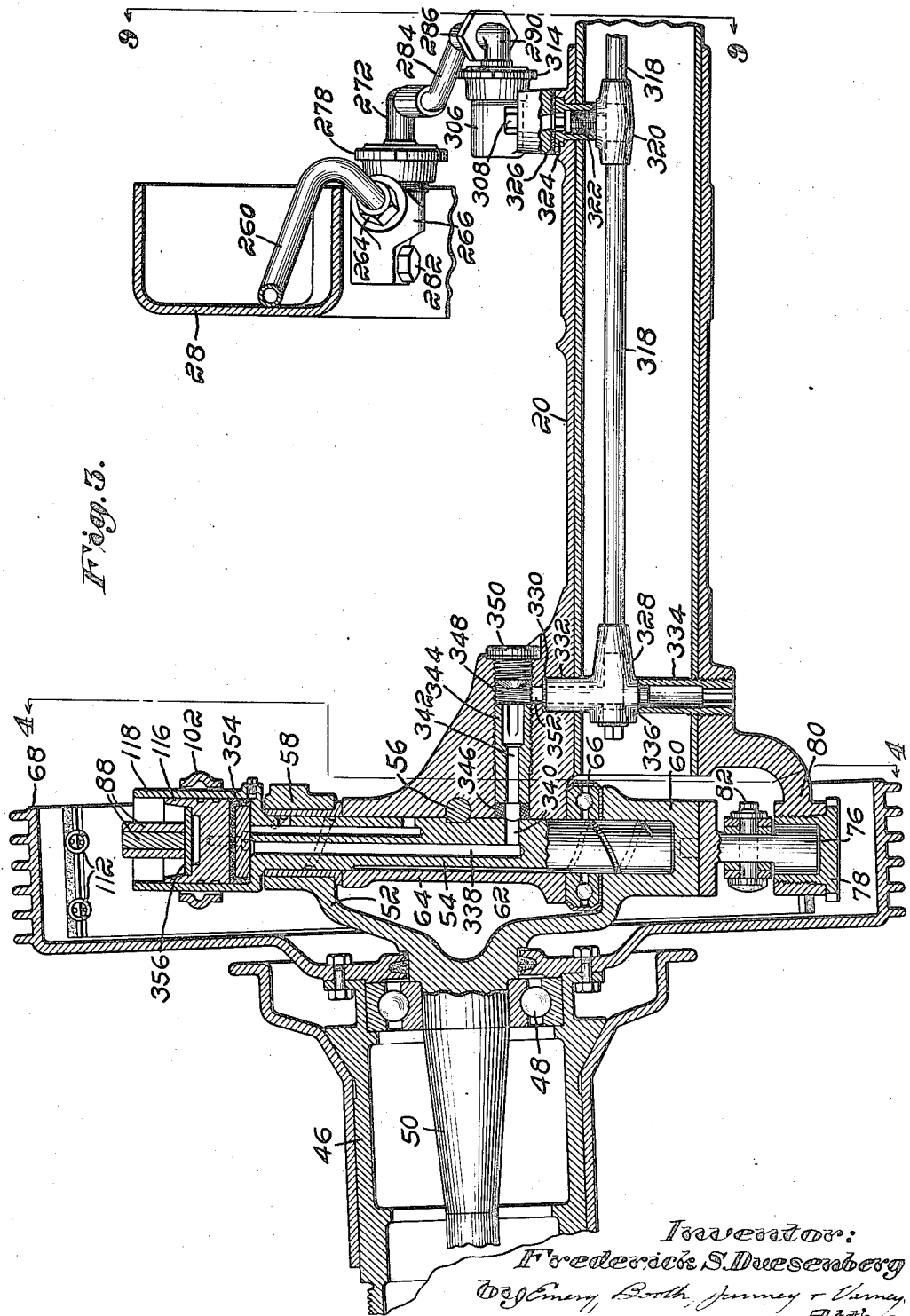

March 25, 1924.

F. S. DUESENBERG 1,488,102

BRAKE SYSTEM

Filed Nov. 2, 1921

Inventor:
Frederick S. Duesenberg,
Emery, Booth, Janney & Varney
Attys.

March 25, 1924. 1,488,102
F. S. DUESENBERG
BRAKE SYSTEM
Filed Nov. 2, 1921  6 Sheets-Sheet 5
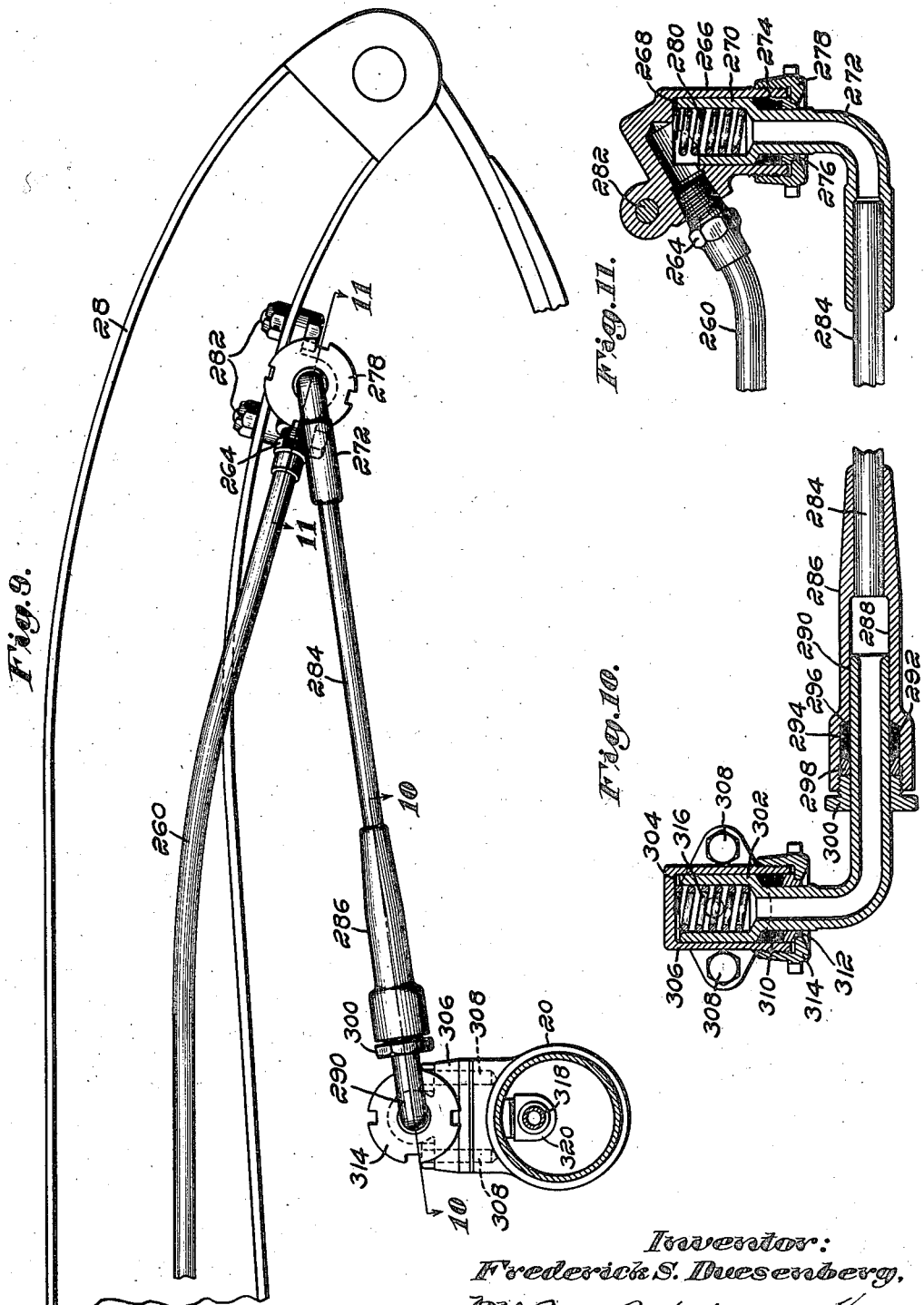
Inventor:
Frederick S. Duesenberg,

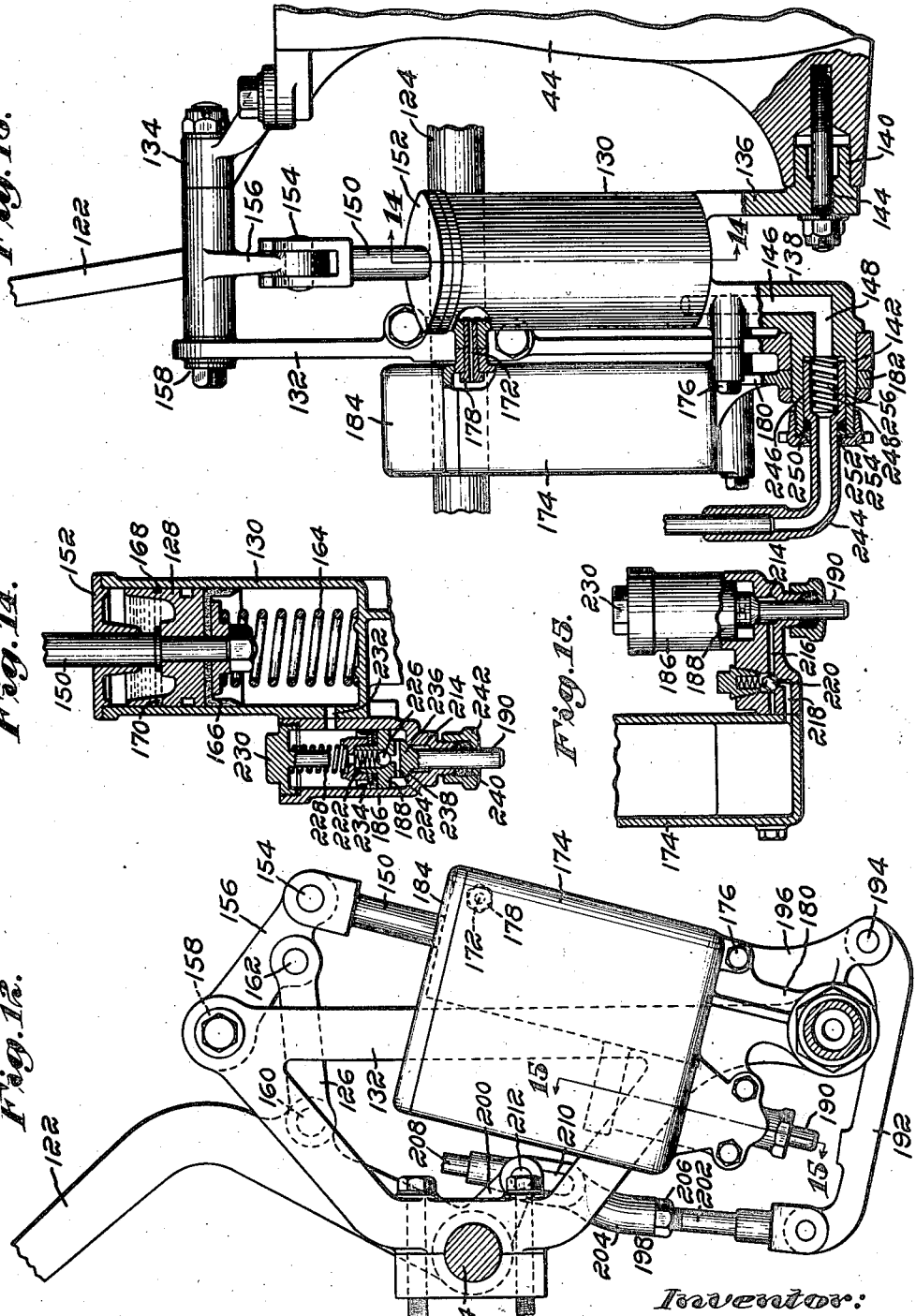

Patented Mar. 25, 1924.

1,488,102

UNITED STATES PATENT OFFICE.

FREDERICK S. DUESENBERG, OF INDIANAPOLIS, INDIANA.

BRAKE SYSTEM.

Application filed November 2, 1921. Serial No. 512,316.

*To all whom it may concern:*

Be it known that I, FREDERICK S. DUESENBERG, a citizen of the United States, and a resident of Indianapolis, Marion County, Indiana, have invented an Improvement in Brake Systems, of which the following description, in connection with the accompanying drawings, is a specification, like characters on the drawings representing like parts.

This invention relates to fluid pressure brake systems, and is more especially concerned with a system having special utility in connection with steerable vehicles, such as motor cars, and particularly those whose front or steering wheels, as well as the rear or driving wheels are equipped with brakes.

The invention will be best understood by reference to the following description, when taken in connection with the accompanying drawings of one illustrative embodiment thereof, while its scope will be more particularly pointed out in the appended claims.

In the drawings:

Fig. 1 is a plan of a motor car chassis equipped with a brake system exemplifying the invention;

Fig. 2 is a side elevation of the same;

Fig. 3 is a detail sectional view on an enlarged scale on line 3—3 of Fig. 2;

Fig. 4 is a sectional view on line 4—4 of Fig. 3;

Fig. 5 is a sectional view on line 5—5 of Fig. 4;

Fig. 6 is a sectional view on line 6—6 of Fig. 4;

Fig. 7 is a sectional view on line 7—7 of Fig. 4;

Fig. 9 is a sectional view on line 9—9 of Fig. 1;

Fig. 10 is a sectional view on line 10—10 of Fig. 9;

Fig. 11 is a sectional view on line 11—11 of Fig. 9;

Fig. 12 is a sectional view on an enlarged scale on line 12—12 of Fig. 1;

Fig. 13 is an elevation partly in section viewed from the right-hand side of Fig. 12;

Fig. 14 is a sectional view on line 14—14 of Fig. 13; and

Fig. 15 is a sectional view on line 15—15 of Fig. 12.

Figure 8:
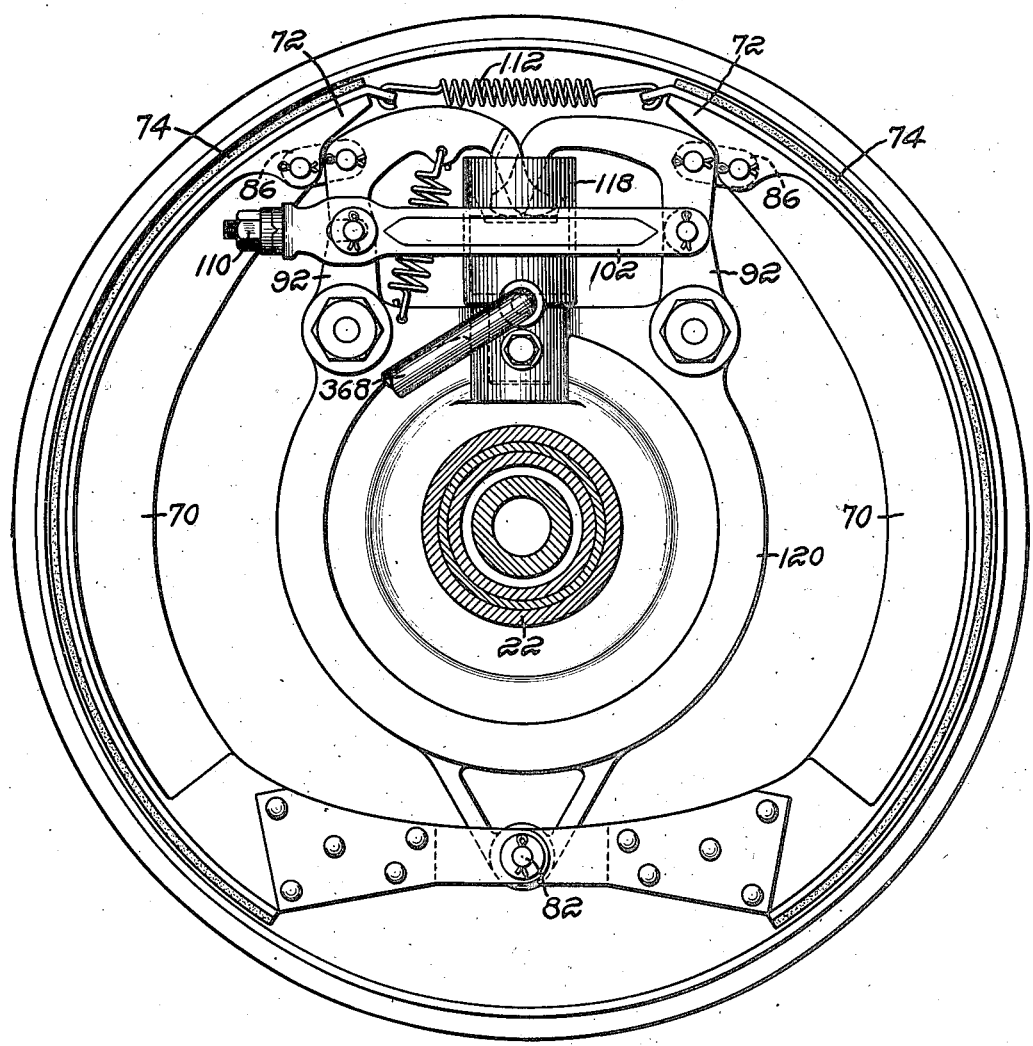
Fig. 8 is a sectional view on an enlarged scale on line 8—8 of Fig. 1.

Referring to the drawings, and to the embodiment of the invention which is selected for exemplification, there is shown in Figures 1 and 2 a portion of the chassis of a motor vehicle minus a part of the motor and a part of the steering gear. The chassis has a pair of front steering wheels 16 and a pair of rear driving wheels 18, conventionally represented in Fig. 2, front and rear axles 20 and 22, front and rear springs 24 and 26, and a spring-supported frame, the latter herein comprising a pair of side members 28 connected by cross members 30, 32, 34, 36 and 38. Herein a torque tube 40, secured to the rear axle housing, is pivotally connected at its front end to the cross member 32. A motor, a portion of which is shown at 42, is supported on the side members 28, and supports a clutch and transmission having a housing 44. The parts thus far described may be of any usual or suitable construction.

A part of the steering mechanism will now be described, reference being had at first to Fig. 3. Each of the front wheels may be provided with a usual hub 46 mounted to turn on bearings, one of which is shown at 48 on a stub axle or spindle 50, herein formed as a part of a steering knuckle 52, the latter being suitably pivoted on the axle 20 as by the provision of a pivot 54 herein secured to the axle by a pin 56. The steering knuckle is herein provided with upper and lower bearings 58 and 60, and has intermediate these bearings a recess 62 which receives a boss 64 formed on the end of the axle 20. In the present example, this boss rests upon a ball-thrust bearing 66 which contributes to the ease of steering the vehicle.

Suitably secured to the wheel hub is a brake-drum 68, and enclosed by the latter is a brake-shoe or shoes, herein exemplified by a pair of brake-shoes 70 having terminals 72. These shoes are preferably provided with usual brake linings 74. Since the brake-drum turns with the steering knuckle, the brake-shoes, in order to remain at all times in cooperative relationship therewith, must also turn in unison with the brake-drum. This is accomplished herein by the provision of a brake-shoe support 76, which is mounted to turn in a bearing 78 on an ear 80 formed on the axle 20. The brake-shoes are suitably pivoted on this support as by a pivot pin 82, and the upper end of the support is coupled to the steering knuckle as by a coupling, herein comprising a pair of tongues 84 received in corresponding openings provided in the lower end of the steering knuckle. The support 76 turns in its bearings 78, thereby permitting the brake-shoes to turn with the brake-drum and steering knuckle.

The brake-shoe actuating mechanism will now be described, reference being had at first to the upper portion of Fig. 4. The brake-shoes are connected by links 86 to levers 88, herein fulcrumed on pivot pins 90 and 91, which have a floating support to equalize the force applied to the brake-shoes. One convenient way of accomplishing this is to mount each of the pivot pins 90 and 91 on a lever 92, which in turn is mounted on a pivot in the form of a stud 94 secured to the steering knuckle 52. If desired, the frictional resistance to turning movement of the levers 92 on their pivots 94 may be increased by the provision of suitably arranged springs 96 shown in Fig. 5, each of which is seated at one end in a recess 98 formed in its lever and at its other end against the steering knuckle. The levers 92 are appropriately coupled together to cause them to move in unison. This is conveniently accomplished in the present example by the provision of a yoke designated generally by the numeral 100 in the form of a U-shaped link, having a pair of arms 102 connecting the pivot pins 90 and 91 to each other.

Initial adjustment and subsequent compensation for wear is conveniently accomplished by varying the distance between the pivot pins 90 and 91. In the present example, this is attained by providing the arms 102 with slots 104, in which the pivot pin 90 is adapted to slide toward and from the pivot pin 91. The pivot pin 90 is adjustable lengthwise of said slots by mounting the same in a yoke 106 having a threaded stem 108 extending through the yoke 100, and provided with an adjusting nut 110. By turning this nut in the proper direction, the distance between the pivot pins 90 and 91 may be varied as desired, thus determining the positions of the fulcra of the levers 88. By this means the clearance between the terminals of the brake-shoes and the inner circumference of the brake-drum is adjusted.

The brake-shoes may be normally held in their retracted positions by a suitably arranged spring or springs 112 directly connecting the terminals 72 to which they are hooked, and I have further provided a spring 114 attached at its upper end to one of the levers 88 and at its lower end to the steering knuckle 52. This spring resists the applying movement of the brake mechanism and restores the latter to its initial position when the applying force is removed. This force is herein furnished by a plunger 116, best shown in Figure 3, mounted to slide in a guide 118 and arranged coaxially with reference to the steering pivot 54. The inner ends of the levers 88 simply rest upon the plunger. When, therefore, the plunger is raised, the levers are rocked on their fulcra and the brake-shoes are brought into contact with the internal surface of the brake-drum. Since the plunger is coaxial with the steering pivot, it follows that turning movement of the steering knuckle is accompanied by swinging movement of the levers 88 about the axis of the pivot. It should here be noted that the latter, as well as the plunger and its guide are mounted within the brake-drum. This enables the axis of the steering pivot to be placed substantially in alignment with the point of contact of the wheel tire with the ground, thereby reducing frictional resistance to the steering movement of the wheels. In the present embodiment, the plunger is a piston and its guide a cylinder constituting a fluid motor to which fluid may be supplied for the operation of the brakes as hereinafter more fully described.

The rear wheel brakes are preferably generally similar to the front wheel brakes hereinbefore described, and it is deemed unnecessary to describe them in detail. For convenience, like parts are designated by corresponding numerals. In the case of the rear brakes, however, the brake-shoes 70, levers 92 and cylinder 118 instead of being carried by a steering knuckle, are mounted on a suitable support 120 suitably formed on or secured to the rear axle housing 22.

The invention contemplates the use of a suitable fluid such as oil for the operation of all four brakes under the control of a single actuating member conveniently located for operation by the driver. In the present example, the actuating member is a pedal 122 (see Fig. 2) fulcrumed on a pivot 124 projecting laterally from the adjacent side of the transmission housing 44 (see Fig. 1). Referring now to Fig. 12, this pedal is suitably connected as by a link 126 with a fluid motor, herein comprising a master piston 128 (see Fig. 14) working in a master cylinder 130. The piston and cylinder are pivotally mounted to swing to and fro accompanying reciprocation of the piston in the cylinder, and in the present example the latter is pivotally supported in part by the transmission housing and in part by a bracket 132, best shown in Fig. 12, which in turn is supported in part by a pivot 124 and in part by a bracket 134 secured to the transmission housing (see Fig. 13). In the present example, the cylinder is provided with two arms 136 and 138 provided, respectively, with bosses 140 and 142 received in bearings provided in the transmission housing 44 and bracket 132, respectively. Preferably, a stud 144 extending axially through the boss 140, holds the latter in place in its bearing. The arm 138 is provided with a passage 146 communicating with the interior of the cylinder 130, and this passage in turn communicates with a passage 148 extending axially through the boss 142. The passage 148 is connected to the several brake cylinders by suitable connections, hereinafter described.

The piston is herein provided with a piston rod 150 guided by a cylinder head 152 secured to the upper end of the master cylinder. The upper end of the piston rod is pivotally connected at 154 to a lever 156, the latter being fulcrumed on a stud 158 which connects the brackets 132 and 134. The link 126 is pivotally connected at 160 to the pedal 122, and at 162 to the lever 156, preferably at a point adjacent the pivot 154.

The lever 156, piston-rod 150, piston 128, and cylinder 130, constitute in effect a toggle which straightens as the piston descends in the cylinder, and the relative arrangement of the parts is such as to cause a relatively rapid expulsion of the fluid at the commencement of the downward movement of the piston and a decreasing speed of expulsion as the piston continues to descend. This is due to the fact that the lever 126 is of the nature of a crank which approaches a dead center as the piston descends. The result is that when the brake pedal is depressed, at first the brakes will move rapidly but with comparatively slight power, but as the movement progresses, the brakes will be applied with increasing force. A suitable spring 164, herein interposed between the bottom of the cylinder and the piston, constantly tends to urge the latter in an upward direction and to restore the pedal and connected parts to the initial position represented in Fig. 12.

It is desirable that there shall be as little leakage as possible past the master piston, and to that end the latter is herein provided with a cupped leather washer 166, as well as a groove 168, the latter when filled with a suitable liquid such as oil presenting an oil seal, which on the one hand tends to prevent leakage of oil in one direction and on the other hand tends to prevent leakage of air past the piston into the space below the latter. This seal is made effective by purposely maintaining above the piston a body of oil which is in communication through a passage 170 with the oil groove 168. The maximum height of this body of oil is determined by an overflow passage 172, which preferably leads to an oil reservoir now to be described.

It is important that the system be kept filled full of oil, otherwise its effectiveness would become impaired, and I have, therefore, provided replenishing means now to be described, reference being had at first to Figs. 12 and 13. A reservoir 174 adapted to contain a supply of oil is suitably supported, preferably by securing the same to the master cylinder, herein by cap-screws 176 and 178. The latter presents a convenient location for the overflow passage 172, which, as shown in Fig. 13, extends axially therethrough. The support of the reservoir is preferably strengthened by providing the same with a depending bracket 180, best shown in Fig. 13, which has a boss 182 encircling and supported by the boss 142 hereinbefore described. It should here be observed that the master cylinder and reservoir are spaced apart, and that a portion of the bracket 132 extends therebetween, as shown in Fig. 13. Preferably, the reservoir is provided with a suitable cover 184.

Advantage is taken of the movements of the brake pedal to cause oil to be supplied from the reservoir to the master cylinder in case of loss through any cause and to "boost" the pressure in the master cylinder should occasion arise for abnormally high pressure. To this end, I have herein provided a pump comprising a cylinder 186 having a piston 188 working therein, the latter having a depending rod 190, which is actuated by, though disconnected from the brake pedal. The lower end of this piston rod is adapted for cooperation with a lever 192, fulcrumed at 194 on a bracket 196 connected by a link 198 with an arm 200 suitably formed on or secured to the brake pedal. Preferably, this link is provided with suitable means of adjustment for varying its length, herein by forming the same in two parts 202 and 204, one threaded into the other and provided with a check-nut 206, whereby the relation between the lever 192 and the lower end of the piston rod 190 may be varied at will. If desired, provision may be made for manual operation of the lever 192 in addition to the pedal operation, and to that end the link 198 is prolonged in an upward direction, as at 208, to a convenient point for operation, and it is provided with a slot 210 in the upper end of which a pivot 212, carried by the arm 200, normally rests. When, therefore, the pedal is depressed, motion is transmitted through the link 198 and lever 192 to the piston rod 190, during which time the pivot 212 remains at the upper end of the slot 210. When, on the other hand, the upwardly extending part of the link is manually operated, the slot 210 permits the link to rise without affecting the pedal.

The lower part of the pump cylinder 186 communicates through a chamber 214 and passages 216 and 218 with the reservoir 174, preferably at the bottom of the same as shown in Fig. 15. A suitable check valve, herein a spring-seated ball 220 permits the flow of oil from the reservoir through the passages 218 and 216 and chamber 214 to the under side of the piston 188, but prevents flow in the reverse direction. When, therefore, the piston is moved in an upward direction by the action of the lever 192, oil is drawn into the cylinder 186.

Oil thus drawn into the space below the piston 188 is transferred to the space above the latter by providing the same with passages 222 and 224 controlled by a suitable check valve, herein a spring-seated ball 226, which permits flow of the oil in an upward direction through the passages to the upper part of the cylinder, but prevents flow in the opposite direction. A suitably arranged spring 228, herein interposed between a cylinder head 230 and the piston, constantly tends to urge the latter in a downward direction, thereby constantly tending to cause the oil beneath the piston to flow therethrough to the upper side thereof, whence it flows through a passage 232 into the master cylinder 130. Preferably, the piston 188 is provided with a cupped leather washer 234 to prevent leakage of oil past the piston in a downward direction.

When in the operation of the brakes, if the system is entirely filled with oil, the lever 192 will not reach the lower end of the piston rod 190, and hence will simply rise and fall idly accompanying movements of the brake pedal. If a loss of oil occurs in the system, the master piston will naturally descend farther owing to the lessened amount of oil in its cylinder, the brake pedal will go nearer to the floor board, and the lever 192 will be brought upward against the lower end of the piston rod 190, thus lifting the pump piston 188 and causing the latter to pump oil into the master cylinder. This operation will be repeated at each stroke of the pedal if the latter, in being depressed, passes a certain predetermined point. Aside from possible loss of oil, the pump may be availed of at any time as a "booster" to provide an extra high oil pressure by depressing the pedal one or more times to a sufficient extent to bring the pump into action.

When in the operation of the pedal, the master piston descends in its cylinder, there is a natural tendency to expel oil into the upper part of the pump cylinder and to cause the pump piston to descend. When the pump piston descends, its descent is limited by a valve 236 which cooperates with a valve seat 238, above the chamber 214 and backward flow of the oil at this point is prevented. To prevent leakage of oil about the piston rod 190, there is preferably provided a stuffing box, comprising a packing 240 encircling a rod and a nut 242 threaded onto the pump cylinder.

The connections between the master cylinder and the brake cylinders will now be described, reference being had at first to Fig. 10. A pipe 244 communicating with the master cylinder is connected therewith by a swivel joint made necessary by the fact that the cylinder swings to and fro in its operation. To this end, the boss 142 carried by the master cylinder is chambered as at 246 to receive an enlarged terminal portion 248 of the pipe 244. Outwardly beyond this enlargement there is provided a packing ring 250 encircling the pipe and interposed between the enlargement and a ring 252, which is held in place by a nut 254 threaded onto the boss 142. A helically coiled spring 256, received within the enlarged terminal portion 248 of the pipe urges the same in an outward direction against the packing ring, and assures a non-leaking joint.

Referring now to Fig. 1, the pipe 244 extends in a lateral and upward direction to a T-fitting 258 supported on the adjacent side frame member 28, and communicating with two conduits 260 and 262, one extending in a forward direction and the other rearwardly along the frame. Referring now to Fig. 9, the pipe 260 is connected by suitable swivel and telescopic joints with a pipe carried by the front axle and communicating with the front wheel brake cylinders. Referring now to Fig. 11, the pipe 260 terminates in a nipple 264, which is threaded into a casing 266 provided with a chamber 268 to receive an enlarged portion 270 of a pipe 272, which turns in the casing. A packing ring 274 encircling the pipe is interposed between the enlarged portion and a ring 276 also encircling the pipe and held in place by a nut 278 threaded onto the casing 266. A helically coiled spring 280 received within the enlarged portion 270 of the pipe urges the latter in an outward direction against the packing 274, and insures a non-leaking swivel connection. The casing is secured to the side frame member 28 at some suitable point by appropriate means, herein two bolts 282 (See Fig. 9).

The pipe 272 is in the form of an elbow, one part of which presents a pivot whose axis extends lengthwise of the axle while the other part is disposed substantially perpendicular thereto, and has an extension, herein a separate piece of pipe 284 secured thereto at one end as by brazing, and at its other end in a similar manner to a casing 286 of a telescopic joint. This casing is provided with a chamber 288 to receive a pipe 290, which telescopes therein and permits up and down movement of the axle to be accompanied by a corresponding change in the length of the pipe connection. A non-leaking joint is assured by the provision of a packing ring 292 encircling the pipe 290 and received in a chamber 294 having a shoulder 296 against which the packing is seated by a ring 298 also encircling the pipe and urged against the packing by a ring 300 threaded into the casing 286.

The pipe 290 is in the form of an elbow, having an enlarged terminal portion 302 extending lengthwise of the axle and received in a chamber 304 provided in a casing 306, the latter being secured to the axle as by cap-screws 308. A packing ring 310 encircling the pipe 290 within the chamber 304 is interposed between the enlarged head 302 and a ring 312, also encircling the pipe and held in place by a nut 314 threaded onto the casing. A helically coiled spring 316 received within the enlargement 302 urges the latter in an outward direction against the packing 310, and insures a non-leaking joint, while permitting turning movement about an axis parallel with the axis of the swivel joint shown in Fig. 11.

The pipe connections carried by the front axle will now be described, reference being had to Fig. 3. The front axle is preferably hollow and within it is a lengthwise pipe 318 having interposed in its length a T-fitting 320 provided with a threaded nipple 322 screwed into a bushing 324, the latter being seated in a correspondingly shaped chamber provided in the axle. A gasket 326 interposed between the bushing and the swivel casing is held under compression by the cap-screws 308 and insures a non-leaking joint at this point.

The pipes 318 lead in opposite directions from the T-fitting 320, and are connected to the respective brake cylinders 118 by connections now to be described. The connections at one end of the axle are similar to those at the other, and a description of one set will suffice for both. The pipe 318 is attached to one branch of an elbow 328, whose other branch is seated against a packing washer 330 in a chamber 332 provided in the axle; it is held so seated by appropriate means, herein a hollow stud 334 threaded in an upward direction into the axle and seated against a shoulder 336 provided on the elbow. By simply screwing the stud in place, the packing washer is held under compression and leakage of oil at that point is prevented.

Communication between the elbow and the brake cylinder is herein afforded by providing the steering pivot 54 with a vertical passage 338, which communicates at its upper end with the cylinder and at its lower end with a horizontal passage 340 extending laterally to the circumferential surface of the pivot where it communicates with a passage 342 provided in a hollow stud 344 threaded into the axle in a horizontal direction, and seated at its inner end against a compressible washer 346 preferably formed of some suitable soft metal such as lead by screwing the stud into place against the washer, a non-leaking joint at this point is afforded. The stud 344 is screwed into a chamber 348, whose outer end is closed by a threaded plug 350, and said chamber communicates by way of a short vertical passage 352 with the elbow 328.

The brake cylinder 118 is preferably formed as an integral part of the steering pivot 54. The piston is herein provided with a cupped leather washer 354, and has a hardened steel plate 356, on which the brake levers 88 rest and turn about the axis of the cylinder accompanying turning movement of the steering knuckles.

The connections leading to the rear brake cylinders will now be described, reference being had to Fig. 1. The pipe 262 is connected by an elbow 358 with a swivel joint 360 and the latter in turn is connected by a telescopic joint 362 with a swivel joint 364, all generally similar to the swivel and telescopic joints shown in Figs. 9, 10 and 11. The swivel joint 364 is connected with a T-fitting 366 having two branch pipe connections 368 leading respectively to the rear brake cylinder 118. The swivel joint 364, T-fitting 366 and pipe connections 368, are all suitably carried by the torque tube 40 which swings vertically, accompanying relative vertical movements of the frame and rear wheels. Thus the swivel and telescopic joints afford the necessary flexibility of the pipe connections to permit these movements.

The general operation of the brake system should be evident from the foregoing, without further description, except to say that the brakes are applied by depressing the pedal, which causes the master piston to descend and expel the fluid from the master cylinder through the described connections to the brake cylinders. When the pressure is removed from the brake pedal, the master piston is restored to its initial position by its spring, while the brake levers and pistons are restored to their initial positions by their respective springs. It should now be evident that the fluid system insures equalization of action of all four brakes, thus affording maximum braking effect while minimizing danger of skidding of the vehicle when the brakes are applied.

Having thus described one embodiment of the invention, but without limiting myself thereto, what I claim and desire by Letters Patent to secure is:

1. In a vehicle, the combination of a pair of road wheels; fluid operated brakes for said wheels, respectively; and an axle on the terminal portions of which said wheels are mounted, said axle affording a passage extending lengthwise of and within said axle intermediate said wheels to conduct operating fluid from a point intermediate said wheels in outward directions to said brakes.

2. In a vehicle, the combination of a pair of road wheels; fluid operated brakes therefor; a hollow axle for said wheels; means to hold said axle against rotation; and a conduit within said axle intermediate said wheels affording a passage to conduct operating fluid to said brakes.

3. In a vehicle, the combination of a pair of wheels; fluid operated brakes therefor; steering pivots on which said wheels turn, affording passages conducting operating fluid to said brakes; and an axle on which said steering pivots are mounted, affording a lengthwise passage therein communicating with said passages of said steering pivots.

4. In a vehicle, the combination of a pair of wheels; fluid operated brakes therefor; steering pivots on which said wheels turn, affording passages conducting operating fluid to said brakes; an axle on which said steering pivots are mounted, affording a lengthwise passage therein communicating with said passages of said steering pivots, and a transverse passage communicating with said longitudinal passage intermediate said pivots.

5. In a vehicle, the combination of a pair of wheels; fluid operated brakes therefor; steering pivots on which said wheels turn, affording passages conducting operating fluid to said brakes; a hollow axle on which said steering pivots are mounted; and a conduit within said axle affording a passage communicating with said passages of said steering pivots.

6. In a fluid brake system, the combination of a brake cylinder and piston; a master cylinder and piston; connections leading from said master cylinder to said brake cylinder; a master piston actuator; a fluid reservoir; and means operated by said actuator to force fluid from said reservoir into said master cylinder, connections and brake cylinder.

7. In a fluid brake system, the combination of a brake cylinder and piston; a master cylinder and piston; connections leading from said master cylinder to said brake cylinder; a master piston actuator; a fluid reservoir; and a pump operated by said actuator to pump fluid from said reservoir into said master cylinder, connections and brake cylinder.

8. In a fluid brake system, the combination of means including a cylinder and piston for developing a pressure within the system; and means for keeping said system supplied with fluid, including a valve admitting fluid to the system and closed by the pressure therein.

9. In a fluid brake system, the combination of means including a cylinder and piston for developing a pressure within the system; and means for keeping said system supplied with fluid, including a valve admitting fluid to the system and closed by the pressure therein, and means responsive only to a reduction of fluid in the system for causing said valve to open and admit fluid to the system.

10. In a fluid brake system, the combination of means including a cylinder and piston for developing a pressure within the system; and means for keeping said system supplied with fluid, including a valve admitting fluid to the system and closed by the pressure therein, and normally inoperative means operating conjointly with said piston to cause said valve to open and admit fluid to the system when the volume of fluid in the system has become reduced below normal.

11. In a fluid brake system, the combination of a brake; a brake-actuating fluid motor; a master fluid motor; connections between said motors to cause operation of said master motor to be accompanied by operation of said brake-actuating motor; and a pump for forcing fluid into said master motor.

12. In a fluid brake system, the combination of a brake; a brake-actuating fluid motor; a master fluid motor; connections between said motors to cause operation of said master motor to be accompanied by operation of said brake-actuating motor, a fluid reservoir; and a pump for forcing fluid from said reservoir into said master motor.

13. In a fluid brake system, the combination of a brake; a brake-actuating fluid motor; a master fluid motor; connections between said motors to cause operation of said master motor to be accompanied by operation of said brake-actuating motor; and an auxiliary fluid motor whose output is delivered to said master motor.

14. In a fluid brake system, the combination of a brake; a brake-actuating fluid motor; a master fluid motor; connections between said motors to cause operation of said master motor to be accompanied by operation of said brake-actuating motor; and means for supplementing the power of said master motor.

15. In a fluid brake system, the combination of a brake; a brake-actuating fluid motor; a master fluid motor; connections between said motors to cause operation of said master motor to be accompanied by operation of said brake-actuating motor; and power means for supplementing the supply of fluid in said master motor.

16. In a fluid brake system, the combination of a brake; a brake-actuating fluid motor; a master fluid motor; connections between said motors to cause operation of said master motor to be accompanied by operation of said brake-actuating motor; and a booster for boosting the pressure in said master motor.

17. In a fluid brake system, the combination of a brake; a brake-actuating fluid motor; a master fluid motor; connections between said motors to cause operation of said master motor to be accompanied by operation of said brake-actuating motor; and means at will to increase the pressure in said master motor to a degree greater than that obtainable by the operation of said master motor alone.

18. In a fluid brake system, the combination of a brake; two interconnected fluid motors one of which operates the other, which in turn operates said brake; a third fluid motor; and means for operating said third fluid motor only after a pressure has been built up in the first two, whereby to augment the pressure in the system.

19. In a brake system, the combination of a brake; two interconnected fluid motors one of which operates the other which in turn operates said brake; a third fluid-motor; and an actuator for the first and third fluid motors adapted to initiate the operation of said third fluid motor subsequently to the initiation of the operation of the first two.

20. In a fluid brake system, the combination of a brake; two interconnected fluid motors one of which operates the other, which in turn operates said brake; a third fluid motor which augments the pressure built up in the first two; and means to cause the operation of the first motor first, followed by the operation of the third motor.

21. In a fluid brake system, the combination of a brake; two interconnected fluid motors one of which operates the other, which in turn operates said brake; and normally inoperative means at will to augment the fluid supply in said motors.

22. In a fluid brake system, the combination of a brake; two interconnected fluid motors one of which operates the other, which in turn operates said brake; and normally inoperative means at will to increase the fluid pressure in said motors.

23. In a fluid brake system, the combination of a brake; two interconnected fluid motors one of which operates the other which in turn operates said brake; and power means for causing an addition to the supply of fluid in said motors after pressure has been built up therein by the operation of one of said motors.

24. In a fluid brake system, the combination of a brake; a brake-actuating fluid motor; a master fluid motor; fluid conducting connections between said motors; and a pump for forcing fluid into said motors and connections, to provide a pressure therein greater than that obtainable by the operation of said master motor.

25. In a fluid brake system, the combination of a brake; a brake-actuating fluid motor; a master fluid motor; fluid conducting connections between said motors; a fluid reservoir; and a pump for forcing fluid from said reservoir into said motors and connections.

26. In a fluid brake system, the combination of a brake; a brake-actuating fluid motor; a master fluid motor; fluid conducting connections between said motors; a pump supplying fluid to said motors and connections; and actuating means common to said master motor and said pump.

27. In a fluid brake system, the combination of a brake; a brake-actuating fluid motor; a master fluid motor; fluid conducting connections between said motors; a pump supplying fluid to said motors and connections; and means to operate said master motor to build up a pressure and to operate said pump to increase such pressure.

28. In a fluid brake system, the combination of a brake; a brake-actuating fluid motor; a master-fluid motor; fluid conducting connections between said motors; a pump supplying fluid to said motors and connections; and means conjointly to operate said master motor and said pump.

29. In a fluid brake system, the combination of a brake; a brake-actuating fluid motor; a master fluid motor; fluid conducting connections between said motors; a pump supplying fluid to said motors and connections; and means to cause said master motor to operate first followed by the operation of said pump.

30. In a fluid brake system, the combination of a brake; a brake-actuating fluid motor; a master fluid motor; fluid conducting connections between said motors; an actuator for said master motor; a fluid reservoir; and normally inoperative means operated by said actuator to force fluid from said reservoir into said motors and connections, said means being responsive to an abnormal movement of said actuator.

31. In a fluid brake system, the combination of a fluid motor for developing a pressure within the system; and means for keeping said system supplied with fluid, including a pump and a valve admitting fluid to said system and preventing flow of fluid past said valve in the opposite direction.

32. In a fluid brake system, the combination of a fluid motor for developing a pressure within the system; and means for forcing fluid into said system, including a pump comprising a cylinder having a piston working therein, and a check valve carried by said piston, opening to admit fluid through said piston to said cylinder and to said motor and closing to prevent backward flow of fluid through said piston.

33. In a fluid brake system, the combination of a fluid motor for developing pressure within the system; a reservoir; means for forcing fluid into said system, including a pump comprising a cylinder having a piston working therein, a check valve carried by said piston, opening to admit fluid through said piston to said cylinder and to said motor and closing to prevent backward flow of fluid through said piston, and other valve means between said reservoir and said pump to prevent backward flow of fluid from said pump to said reservoir.

34. In a fluid brake system, the combination of a fluid motor for developing a pressure within the system; and means for forcing fluid into said system, including a pump comprising a movable member, and valve means carried by said member, opening to admit fluid to said motor and closing to prevent backward flow of fluid from said motor.

35. In a fluid brake system, the combination of a fluid motor for developing a pressure within the system; and means for keeping said system supplied with fluid, including a pump and a common actuator for said motor and said pump.

36. In a fluid brake system, the combination of a fluid motor for developing a pressure within the system; and means for keeping said system supplied with fluid, including a pump and means to cause initiation of the operation of said motor followed by operation of said pump.

37. In a fluid brake system, the combination of a fluid motor for developing a pressure within the system; a pivotal mounting for said motor; means for operating said motor by swinging it with reference to said pivotal mounting; and a pump carried by said motor for supplying fluid thereto.

38. In a fluid brake system, the combination of a fluid motor for developing a pressure within the system; a pivotal mounting for said motor; means for operating said motor by swinging it with reference to said pivotal mounting; and a pump and a reservoir carried by said motor for supplying fluid thereto.

39. In a fluid brake system, the combination of a cylinder and piston for developing a pressure within the system; a pivotal mounting for said cylinder; means for causing lengthwise movement of said piston in said cylinder to be accompanied by swinging movement of said cylinder with reference to said pivotal mounting; and an auxiliary cylinder and piston carried by the first-mentioned cylinder in its swinging movement and supplying fluid thereto.

40. In a fluid brake system, the combination of means including a cylinder and piston for developing a pressure of liquid within the system and below said piston; and means for causing the maintenance of a liquid seal about said piston tending to prevent the entrance of air past said piston into said cylinder by maintaining a body of liquid above said piston.

41. In a fluid brake system, the combination of means including a cylinder and piston for developing a pressure within the system; means including a reservoir for keeping said system supplied with liquid; and means for causing the maintenance of a liquid seal about said piston tending to prevent the entrance of air past said piston into said cylinder by maintaining a body of liquid above said piston, and predetermining the amount of liquid in such body by returning to said reservoir liquid in excess of the predetermined amount.

In testimony whereof, I have signed my name to this specification.

FREDERICK S. DUESENBERG.